US006578134B1

United States Patent
Van Dyke et al.

(10) Patent No.: US 6,578,134 B1
(45) Date of Patent: Jun. 10, 2003

(54) MULTI-BRANCH RESOLUTION (75) Inventors: Korbin Van Dyke, Sunol, CA (US);
Niteen Patkar, Sunnyvale, CA (US);
Shalesh Thusoo, Milpitas, CA (US);
TR Ramesh, Newark, CA (US)

(73) Assignee: ATI International SRL, Christ Church (BB)

( * ) Notice: Subject to any disclaimer, the term of this patent is extended or adjusted under 35 U.S.C. 154(b) by 0 days.

(21) Appl. No.: 09/451,300

(22) Filed: Nov. 29, 1999

(51) Int. Cl.⁷ .............................. G06F 9/38; G06F 9/42
(52) U.S. Cl. ...................... 712/219; 712/236; 712/239; 712/234; 712/213
(58) Field of Search .......................... 712/219, 23, 237, 712/234, 239, 236, 240, 245, 206, 213; 713/600, 501

(56) References Cited

U.S. PATENT DOCUMENTS 5,542,109 A  *  7/1996 Blomgren et al. .......... 712/234
5,987,620 A  * 11/1999 Tran ........................... 713/600

* cited by examiner

*Primary Examiner*—Daniel H. Pan
(74) *Attorney, Agent, or Firm*—Vedder, Price, Kaufman & Kammholz (57) ABSTRACT

A branch resolution logic for an in-order processor is provided which scans the stages of processor pipeline to determine the oldest branch instruction having sufficient condition codes for resolution. The stages are scanned in order from the latter stages to the earlier stages, which allows quick and simple branch resolution. Therefore, because branches are resolved as soon as the necessary condition codes are generated in a specific stage, branch mispredict penalties are minimized.

4 Claims, 5 Drawing Sheets

MULTI-BRANCH RESOLUTION

BACKGROUND OF THE INVENTION

1. Field of the Invention

The present invention relates to pipelined computers and, in particular, to a branch resolution scheme for in-order pipelined computers.

2. Discussion of the Related Art

In a non-pipelined computer, each instruction executed by the computer is processed until the instruction is completed before processing begins on the next instruction in the sequence. Computer performance can be increased by pipelining instructions to increase the speed of the computers. A pipelined computer divides instruction processing into a series of steps or stages, such as fetch, decode, execute, and write, where each of the stages is executable in a single clock cycle. Because the stages are pipelined, the computer can operate on different instructions simultaneously at different stages of the pipeline. Therefore, once the pipeline is full, an instruction is generally completed every clock cycle, thereby increasing the computer's throughput.

For example, during a first operation cycle, a first instruction is fetched from memory in the fetch stage. During a second operation cycle, the first instruction is decoded in the decode stage and a second instruction is fetched from memory in the fetch stage. During a third operation cycle, the first instruction is executed in the execute stage, the second instruction is decoded in the decode stage, and a third instruction is fetched from memory in the fetch stage. In a fourth operation cycle, the result of the first instruction is written to registers and memory in the write stage, the second instruction is executed in the execute stage, the third instruction is decoded in the decode stage, and a fourth instruction is fetched in the fetch stage. Processing continues in the pipeline such that a result from each instruction is available every operation cycle. Thus, in the example, a pipelined computer can process four instructions simultaneously, whereas a non-pipelined computer can only process one instruction at a time. Accordingly, the overall speed of computer processing can be significantly increased over a non-pipelined computer.

A pipelined computer operates most efficiently when instructions are executed in the order in which they appear in memory so that each instruction proceeds sequentially through the stages with another instruction proceeding sequentially one stage behind. However, some types of instructions can cause execution to jump to a specified instruction that is different from the next instruction in the sequence, thereby disturbing the sequence of instructions. One such type of instruction is a branch instruction, which either causes processing to jump to a new instruction at a target address designated by the branch instruction (branch"taken") or allows processing to continue with the next sequential instruction (branch "not taken").

As with other instructions, a branch instruction proceeds sequentially through the pipeline. Thus, the ranch instruction and each following instruction is processed through succeeding stages for several clock cycles until the branch instruction has completed the execution stage. At this point, the branch is resolved, i.e., taken or not taken. If the branch is taken, the fetch stage fetches the instruction at the target address, and the instructions following the branch instruction are cleared from each stage to "flush" the pipeline. Processing then continues with the instruction at the target address. However, the stages that were flushed are inactive until the instruction reaches each stage, which reduces the efficiency of the pipeline. If the branch is resolved as not taken, processing continues along the pipeline. Branches can be conditional (resolved as taken or not taken) or unconditional (always taken).

One way to increase the performance of executing a branch instruction is to predict the outcome of the branch instruction, i.e., in the decode stage, before it is executed. If the branch is predicted as taken, the instruction at the target address is fetched and inserted into the pipeline immediately following the branch instruction. However, if the branch is predicted as taken but resolved as actually not taken, the stages following the branch instruction are flushed and a mispredict penalty is incurred. If the branch is predicted as not taken, then the pipeline continues with normal sequential processing. However, if the branch is predicted as not taken but resolved as actually taken, the stages following the branch instruction are flushed, and the instruction at the target address is fetched and inserted into the pipeline. Again, a mispredict penalty is incurred. Accordingly, processing efficiency is reduced only when the branch is mispredicted.

Several types of branch prediction schemes have been developed to decrease the chances of misprediction and are well known in the art. One type of branch prediction scheme uses a branch target buffer (BTB) that stores a plurality of entries including an index to a branch instruction. In addition to the index, each entry may include an instruction address, an instruction opcode, and history information. With a branch target buffer, each instruction is monitored as it enters into the pipeline. An instruction address matching an entry in the branch target buffer indicates that the instruction is a branch instruction that has been encountered before. After the entry has been located, the history information is tested to determine whether or not the branch will be predicted to be taken.

Typically, the history is determined by a state machine which monitors each branch in the branch target buffer, and allocates bits depending upon whether or not a branch has been taken in the preceding cycles. If the branch is predicted to be taken, then the predicted instructions are inserted into the pipeline. Typically, the branch target entry will have opcodes associated with it for the target instruction, and these instructions are inserted directly into the pipeline.

Branch prediction schemes, however, do not completely eliminate mispredictions. With branch prediction schemes that are not 100% accurate, the computer must wait until the branch is resolved to determine if the branch was correctly predicted, typically in the execute or write stages. Because the branch may take several stages or clock cycles to resolve, the mispredict penalty can be substantial. Therefore, it is desirable to resolve the branck instruction as early as possible to decrease the amount of mispredict penalty incurred by waiting for branch resolution. Therefore, it is desirable to resolve the branch instruction as early as possible to decrease amount of mispredict penalty incurred by waiting for branch resolution.

SUMMARY

In accordance with the present invention, branch resolution for an in-order pipelined processor is performed by scanning the stages of the pipeline to determine the oldest conditional branch instruction (i.e., the branch instruction farthest along in the pipeline) having enough condition codes for resolution.

After a branch is predicted as taken or not taken, stages in the pipeline are scanned from the later stages to the earlier stages until a stage is found with the necessary condition codes to resolve a branch, thereby allowing an in-order processor to quickly and simply resolve a branch as soon as enough condition codes are generated in a specific stage. If the branch resolution determines that the branch has been mispredicted, then program control is shifted to an alternate program counter (PC) to fetch the correct target address, insert that address into the pipeline, and clean out the pipeline. By resolving branches as soon as possible, branch mispredict penalties are minimized, thereby increasing the efficiency of the processor.

In one embodiment of the present invention, branch prediction occurs in the convert (C) stage, and branch resolution scans the pipeline from the stage (Z) after the write stage back to the decode (D) stage, i.e., Z→W→E→M→A→R→D, to determine the oldest branch having sufficient condition codes for resolution. W is the write-back stage, E is the execute stage, M is the memory stage, A is the address generation stage, and R is the read stage.

The present invention will be more fully understood in light of the following detailed description taken together with the accompanying drawings.

BRIEF DESCRIPTION OF THE DRAWINGS

Use of similar reference numbers in different figures indicates similar or like elements.

DETAILED DESCRIPTION

Figure 1:
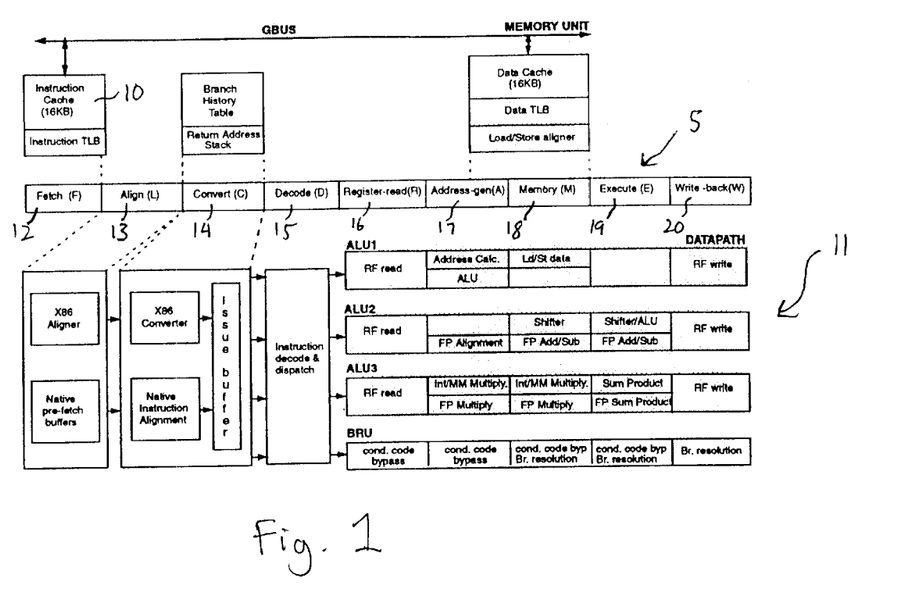
FIG. 1 is a block diagram of a portion of an in-order pipeline processor according to one embodiment of the present invention.

The present invention is described with reference to a superscalar processor with a multi-stage in-order pipeline. FIG. 1 shows a portion of such a processor with a nine-stage pipeline 5, for illustration. A control unit (not shown) fetches instructions from an instruction cache 10 and then decodes and issues the instructions to a datapath 11. The control unit also handles branch instructions by computing the target address, predicting the direction of the branch, and resolving these branches later in the pipeline. The control unit can issue up to three integer/floating point/media instructions along with a branch instruction. Instructions are issued in order, and with the exception of load/store instructions, all instructions are completed in order.

The pipeline 5 has nine stages: an fetch (F) stage 12, an align (L) stage 13, a convert (C) stage 14, a decode (D) stage 15, a register-read (R) stage 16, an address-generation (A) stage 17, a memory (M) stage 18, an execute (E) stage 19, and a write-back (W) stage 20. A stage T (not shown) can be included between C stage 14 and D stage 15 in pipeline 5 for additional conversion. The F stage 12 accesses instruction cache 10 coupled to a memory unit to fetch the desired instruction bytes for processing. Instructions can be x86 instructions or instructions native to the processor, i.e., instructions that are decoded and executed by the processor directly. x86 instructions are variable length (1 to 15 bytes) and byte aligned, while native instructions are fixed length. Thus, if the instruction fetched is an x86 instruction, the L stage 13 shifts and rotates bytes to provide the proper instruction to the C stage 14. If the instruction fetched is a native instruction, the L stage 13 is essentially bypassed as instructions are stored in a pre-fetch buffer in the L stage 13.

The C stage 14 converts an x86 instruction into a sequence of native instructions necessary to execute the x86 instruction. C stage 14 also performs branch prediction by computing the branch target address for PC (program counter) relative x86 and native branches and dynamically predicting the direction of the branch. Branch prediction algorithms are well known. If the branch is predicted as taken, then execution proceeds along the predicted path instead of the normal sequential path. The D stage 15 then decodes and issues the instructions to the appropriate execution units, i.e., ALU1, ALU2, ALU3, and BRU (Branch Unit). D stage 15 selects the execution unit based on the type of instruction and the position of the instruction in the issue buffer. In R stage 16, operands are read from a register file for current instructions being issued.

In A stage 17, M stage 18, and E stage 19, various functions are performed by the execution units ALU1, ALU2, and ALU3. In the A stage 17, ALU1 performs address calculation or generation and generates condition codes or flags, ALU2 compares exponents and aligns and adds mantissas for floating point operations, and ALU3 executes the first step of floating point or integer multiplication. In the M stage 18, ALU1 accesses the data cache and aligns data, ALU2 performs shifting and adds the mantissa, and ALU3 executes the second step of floating point or integer multiplication. In the E stage 19, ALU2 handles arithmetic, logical and shift instructions and generates conditional flags, and ALU3 handles arithmetic, logical, and multiply instructions and generates conditional flags. Results and flags associated with these instructions are available at the end of the E stage. Thus, floating point instructions in ALU2 and ALU3 start in the A stage and complete in the E stage with a throughput of one. In the W stage 20, results generated from the datapath are written in a register file. Additional details of the data path and the ALUs can be found in commonly-owned U.S. Pat. Ser. Nos. 09/328,844, entitled "Method and Apparatus for Sharing Cache Memory", filed Jun. 9, 1999, 09/328,971, entitled "Method and Apparatus for Busing Data Elements", filed Jun. 9, 1999, and 09/037,830, entitled "Method and Apparatus of Configurable Processing", filed Aug. 18, 1999, now abandoned all of which are incorporated by reference herein in their entirety.

In addition to the functions described above, conditional branches are also resolved in the pipeline. Branch resolution checks if the correct instructions are in the pipeline following the branch. A branch is resolved in a particular pipeline stage if, in that stage, it is known whether or not a conditional branch will be or has been taken. If branch resolution determines that an incorrect instruction is following a branch instruction, then the pipeline is flushed according to conventional techniques, and the correct target is inserted into the pipeline. This delay in inserting a correct target is known as a mispredict penalty, which reduces the efficiency of the pipeline. Therefore, once a branch is predicted as taken or not taken, the branch should be resolved as soon as possible to minimize mispredict penalties. Conventional architectures do not resolve branches until typically the execute or write stage.

On the other hand, processors according to the present invention look at information in each stage of the pipeline to determine if enough information exists in that stage to resolve a branch. For in-order machines, such as described herein, instructions generally proceed along the pipeline in order, i.e., R→A→M→E→W. Load and store instructions can proceed out of order, but arithmetic and logical instructions, as well as branch instructions and conditional code computations, are performed in order. Thus, at each stage, there can be one conditional branch proceeding in order. And because three ALUs are processing instructions in parallel along the data path at each-stage, three instructions can be modifying the condition codes at each stage. For example, at the first cycle in the R stage, ALU1 might be operating on instruction 2 (INSTR2), ALU2 on instruction 1 (INSTR1), and ALU3 on instruction 3 (INSTR3). At the next cycle, INSTR2, INSTR1, and INSTRU3 advance to the A stage of ALU1, ALU2, and ALU3, respectively, of the pipeline, and a new set of instructions is issued to the R stage of the ALUs. Thus, instructions proceed accordingly in order until a result is obtained and written to the register file.

Conditional branches can be issued with any instruction generating condition codes or flags. The conditional branch then acts on the condition codes from the corresponding instruction and any preceding instructions. For example, if a conditional branch was issued with INSTR2, then the conditional branch looks at condition codes generated with INSTR1 and all older instructions. The oldest conditional branch in the pipeline, i.e., the branch that was issued earliest or is farthest along in the pipeline, which also has all of its condition codes available for evaluation, is then resolved to determine if the branch was predicted correctly. If the branch was correctly predicted, the instructions proceed without interruption through the pipeline. However, if the branch was incorrectly predicted, the control flow of the pipeline is shifted to an alternate PC and the instructions following the conditional branch are flushed from the pipeline. Therefore, because the instructions are advancing in order, the stages of the pipeline can be evaluated quickly with a simple algorithm which scans the stages from the last stage to the first stage to determine the oldest conditional branch capable of resolution and thereby minimize branch mispredict penalties.

For the processor described herein, conditional branches include $J_{cc}$, $CJ_{cond}$, $CJ_{condi}$, and $CJF_{cond}$. $J_{cc}$ (Jump on Integer Condition) jumps to a target address if the status flags CF (carry flag), OF (overflow flag), SF (sign flag), Z (zero flag), or PF (parity flag) are set or clear according to Table 1 below:

TABLE 1

| Condition | Meaning |
|---|---|
| OF = 1 | Overflow |
| OF = 0 | No overflow |
| CF = 1 | Below |
| CF = 0 | Above or equal |
| ZF = 1 | Equal |
| ZF = 0 | Not equal |
| (CF or ZF) = 1 | Below or equal |
| (CF or ZF) = 0 | Above |
| SF = 1 | Sign |
| SF = 0 | No sign |
| PF = 1 | Parity even |
| PF = 0 | Parity odd |
| (SF and OF) = 1 | Less |
| (SF and OF) = 0 | Greater or equal |
| ((SF and OF) or ZF) = 1 | Less or equal |
| ((SF and OF) or ZF) = 0 | Greater |

The target address is constructed by adding the sign-extended value Disp to the segment offset of the instruction sequentially following the $J_{cc}$ condition. Disp is a signed 20-bit value, specified with each of the above 16 flag conditions, that indicates the number of 32-bit words between the instruction sequentially following the $J_{cc}$ and the target. It should be noted that multiple instructions that update flags could be alive in the pipeline. Bypassing of flags imply that flag updates corresponding to the oldest flag generating instruction (relative to the corresponding branch) is available for the branch instruction.

$CJ_{cond}$ (Compare Integers and Jump) jumps to a target address if the designated condition is met between integer values in two registers, where the condition can be EQ (equal to), NE (not equal to), GT (greater than), LT (less than), GE (greater than or equal to), or LE (less than or equal to). $CJ_{condi}$ (Compare Integers and Jump with Immediate) jumps to a target address if a designated condition is met between integer values in a register and a 6-bit signed immediate value, where the conditions are the same as with the $CJ_{cond}$ conditional branch. $CJF_{cond}$ (Compare Floats and Jump) jumps to a target address if the designated condition is met between two floating point values, where the condition can be EQ, NE, GT, LT, GE, LE, OD (ordered), or UN (unordered)

Table 2 below lists the required criteria in each stage for branch resolution. Resolution criteria is first scanned in the Z stage. The Z, or equivalently the W+1, stage is used in branch resolution for extending the W stage for condition codes that are unable to be generated in the W stage. Thus, branch resolution criteria is first scanned in the last stage in the pipeline, which is the Z stage for branch resolution logic. If a multiply or shift instruction is issued with a $J_{cc}$ conditional branch, then condition codes are not available until the Z stage for resolving $J_{cc}$, where it is resolved. However, if a multiply or shift instruction is issued, but not with $J_{cc}$, then the W stage contains sufficient condition codes to resolve $J_{cc}$. The W stage is also scanned to determine if $CJ_{cond}$, $CJF_{cond}$, or $CJ_{condi}$ is executed in ALU2 or ALU3 in the preceding E stage. If yes, then, the corresponding branch is resolved in the W stage.

If a conditional branch still has not been resolved, then the E stage is scanned. If no flag or code generating instructions are in the W stage or if the only flag generating instruction is in the W stage and the instruction was executed in ALU1 or if the only flag generating arithmetic instruction is in the W stage and the instruction was executed in ALU2 or ALU3, then sufficient condition codes exist in the E stage to resolve $J_{cc}$. If no branches have been resolved, the remaining resolution criteria of Table 1 are scanned from M→A→R→D until the oldest branch having available condition codes is resolved.

TABLE 2

| Pipe Stage | Branches Resolved | Criteria for Resolution |
|---|---|---|
| D | Jcc | No flag generating instructions in D,R,A,M,E,W stages, OR Only flag generating instruction is in E,W and the instruction was executed in ALU1, OR Only flag generating arithmetic instruction in W and the instruction was executed in ALU2 or ALU3 |
| R | Jcc | No flag generating instructions in A,M,E,W stages, OR Only flag generating instruction if in E,W and the instruction was executed in ALU1, OR Only flag generating arithmetic instruction in W and the instruction was executed in ALU2 or ALU3 |
| A | Jcc | No flag generating instructions in M,E,W stages, OR Only flag generating instruction is in E,W and the instruction was executed in ALU1, OR Only flag generating arithmetic instruction in W and the instruction was executed in ALU2 or ALU3 |
| M | Jcc, CJcond, | Jcc resolved if: No flag generating instructions in E,W stages for Jcc, OR |

TABLE 2-continued

| Pipe Stage | Branches Resolved | Criteria for Resolution |
|---|---|---|
| | CJcondi | Only flag generating instruction is in E,W and the instruction was executed in ALU1, OR Only flag generating arithmetic instruction in W and the instruction was executed in ALU2 or ALU3. CJcond/CJcondi resolved if CJcond/CJcondi was executed in ALU1 in A stage. |
| E | Jcc | No flag generating instruction in W stages, OR Only flag generating instruction if in E,W and the instruction was executed in ALU1, OR Only flag generating arithmetic instruction in W and the instruction was executed in ALU2 or ALU3 |
| W | Jcc, CJcond, CJcondi, CJFcond | Jcc resolved except if a multiply or shift instruction was issued along with the branch. CJcond/CJcondi/CJFcond resolved if CJcond/CJcondi/CJFcond was executed in ALU2 or ALU3 in E stage. |
| Z | Jcc | A multiply or shift instruction was issued along with the Jcc instruction |

FIGS. 2A–2D are portions of a flowchart of the branch resolution logic of Table 2. After branch prediction, resolution criteria in the Z stage is scanned at step 200, and a determination of whether condition 1 was met is made at step 201. Condition 1 is whether a multiply or shift instruction is issued with the $J_{cc}$ instruction. If condition 1 is met, $J_{cc}$ is resolved in the Z stage at step 202, and if condition 1 is not met, resolution criteria is scanned at step 203 in the preceding stage, i.e., the W stage. After scanning the W stage, a determination of whether condition 2A is met at step 204. Condition 2A is whether $J_{cc}$ was issued without a multiply or shift instruction. If condition 2A is met, $J_{cc}$ is resolved in the W stage at step 205. However, if condition 2A is not met, conditional branches can still be resolved in the W stage by meeting conditions 2B, 2C, or 2D, as determined at steps 206, 208, and 210, respectively. If condition 2B is met, i.e., $CJ_{cond}$ executed in ALU2 or ALU3 in the preceding E stage, then $CJ_{cond}$ is resolved in the W stage at step 207. If condition 2C is met, i.e., $CJ_{condi}$ executed in ALU2 or ALU3 in the E stage, then $CJ_{condi}$ is resolved in the W stage at step 209. If condition 2D is met, i.e., $CJF_{cond}$ executed in ALU2 or ALU3 in the E stage, then $CJF_{cond}$ is resolved in the W stage at step 211. Note that conditions in each stage can be determined simultaneously or sequentially in a different order.

If the conditions 2A–2D in the W stage are not met, resolution criteria in the E stage is scanned at step 212. If conditions 3A, 3B, or 3C are met, as determined at respective steps 213, 214, and 215; then $J_{cc}$ is resolved in the E stage at step 216. Condition 3A is no flag generating instruction in the W stage, condition 3B is the only flag generating instruction is in the E and W stage and the instruction was executed in ALU1, and condition 3C is the only flag generating arithmetic instruction is in the W stage and the instruction was executed in ALU2 or ALU3. If conditions 3A–3C in the E stage are not met, resolution criteria in the M stage is scanned at step 217. If condition 4A is met, as determined at step 218, $CJ_{cond}$ is resolved in the M stage at step 219. Condition 4A is $CJ_{cond}$ is executed in ALU1 in the A stage. $CJ_{condi}$ is resolved in the M stage at step 221 if step 220 determines that condition 4B has been met, i.e., $CJ_{condi}$ is executed in ALU1 in the A stage. If conditions 4C, 4D, or 4E are met, as determined at respective steps 222, 223, and 224, then $J_{cc}$ is resolved in the M stage at step 225. Condition 4C is no flag generating instruction in the E and W stage for $J_{cc}$, condition 4D is the same as condition 3B, and condition 4E is the same as condition 3C.

If resolution criteria 4A–4E are not met in the M stage, resolution criteria in the A stage is scanned at step 226. If conditions 5A, 5B, or 5C are met, as determined at respective steps 227, 228, and 229, then $J_{cc}$ is resolved in the A stage at step 230. Condition 5A is no flag generating instruction in the M, E, and W stage, condition 5B is the same as condition 3B, and condition 5C is the same as condition 3C. If these resolution criteria in the A stage are not met, resolution criteria is then scanned in the R stage at step 231 to determine if branches can be resolved in the R stage. If conditions 6A, 6B, or 6C are met, as determined at respective steps 232, 233, and 234, then $J_{cc}$ is resolved in the R stage at step 235. Condition 6A is no flag generating instruction in the A, M, E, and W stage, condition 6B is the same as condition 3B, and condition 6C is the same as condition 3C. If conditional branches still cannot be resolved, resolution criteria is scanned in the D stage at step 236. If conditions 7A, 7B, or 7C are met, as determined at respective steps 237, 238, and 239, then $J_{cc}$ is resolved in the D stage at step 249. Condition 7A is no flag generating instruction in the D, R, A, M, E, and W stage, condition 7B is the same as condition 3B, and condition 7C is the same as condition 3C. As the flowchart shows, branch resolution is determined by scanning resolution criteria from the oldest stage in the pipeline to earlier stages until a branch can be resolved.

It should be noted that the ALUs do not necessarily produce condition codes at the same stages in the pipeline. For example, in the processor described herein, ALU1 generates some condition codes in the A stage, while ALU2 and ALU3 generate condition codes in the E stage. Therefore, even though instructions are issued and advance in order, condition codes may not necessarily be produced in order in the pipeline. The resolution criteria in Table 2 accounts for this by requiring different resolution criteria depending on which ALU executed a condition code or flag generating instruction.

In other embodiments, the number of branch resolution criteria can be increased so that resolution criteria can be made more specific to certain instructions and conditional branches. For example, some instructions may generate a single condition code, from which a conditional branch solely depends. In such a case, the conditional branch is resolved only when the specific instruction generates the required condition code. Using Table 2 as an illustration, in the Z stage, all $J_{cc}$'s issued with a multiply or shift instruction are resolved in the Z stage. However, if some $J_{cc}$'s require condition codes generated by only multiply or shift, then another set of resolution criteria might include this subclass of $J_{cc}$'s.

Figure 3:
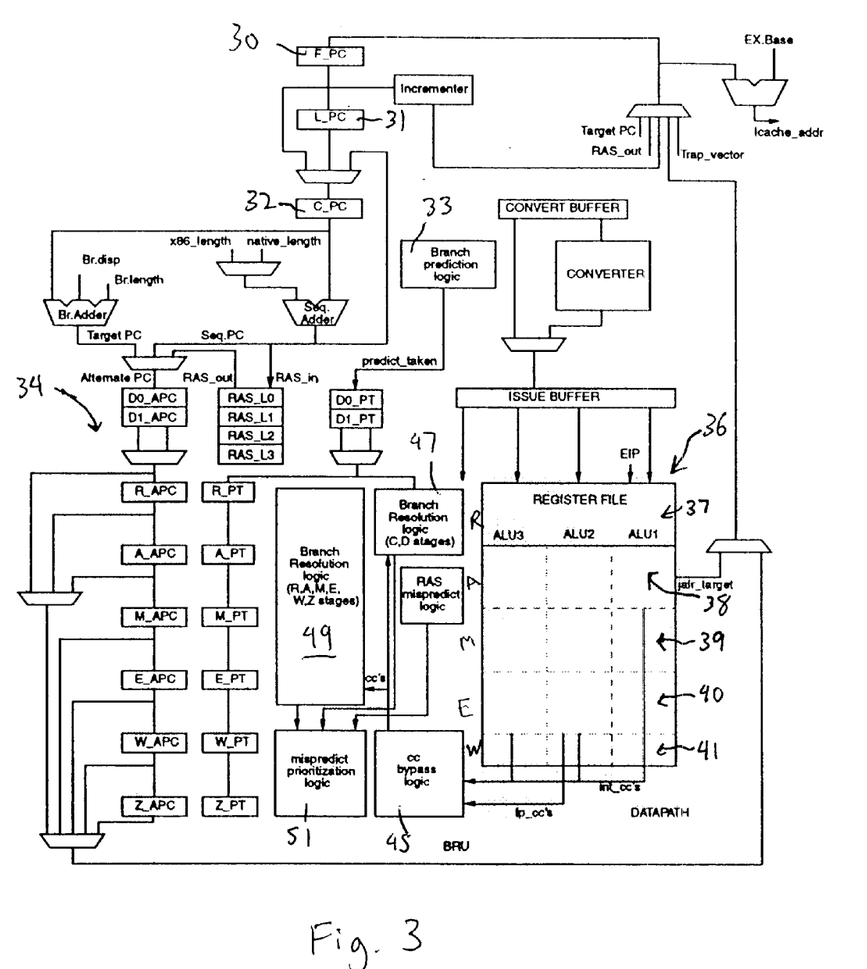
FIG. 3 is a block diagram of branch processing with branch resolution logic for the processor of FIG. 1.

FIG. 3 is a block diagram for branch processing in the processor described herein. An issued instruction advances along a fetch program counter (F_PC) 30 to an align PC (L_PC) 31 then to a convert PC (C_PC) 32. The target PC is computed in the C stage, as is the prediction of the outcome of a conditional branch instruction, which is performed in branch prediction logic 33. If predicted as taken, the sequential PC, which is the next instruction following the branch instruction, is sent down an alternate PC (APC) 34 with a flag set as "predicted taken" and the target PC is sent to the instruction cache. If predicted not taken, the target PC is sent down the alternate PC 34 with a flag set as "predicted not taken", and the next sequential address sent.

The predicted branch is then resolved in stages D, Z, or in stages of datapath 36, which is divided into R stage 37, A stage 38, M stage 39, E stage 40, and W stage 41. As seen from FIG. 3, ALU1 generates some condition codes, which are available after the A stage, and ALU2 and ALU3 generate other condition codes, which are available after the E stage. Condition codes generated from ALU1, ALU2, and ALU3 are transmitted to a condition code (cc) bypass logic 45, which routes the appropriate condition codes to branch resolution logic 47 and 49. Branch resolution logic 47, using the condition codes from cc bypass logic 45, scans the D stage and any earlier stages to determine the oldest stage that a branch can be resolved and then resolves that branch. Branch resolution logic 49 scans the R, A, M, E, W, and Z stages to determine the oldest stage that a branch can be resolved and then resolves that branch.

Once a branch is resolved, the results of branch resolution logic 47 and 49 are input to a mispredict prioritization logic 51. The results of branch resolution logic 47 and 49 show multiple branches in different stages being resolved simultaneously. Prioritization logic 51 prioritizes the oldest branch that results in a mispredict and starts the fetch of the alternate PC corresponding to that branch. If a branch is resolved as mispredicted, the alternate PC is sent to the instruction cache, and instructions remaining in the pipeline which follow the branch instruction are flushed. If the branch was mispredicted as taken, then the alternate PC contains the sequential PC, and if the branch was mispredicted as not taken, then the alternate PC contains the target PC.

The above-described embodiments of the present invention are merely meant to be illustrative and not limiting. It will thus be obvious to those skilled in the art that various changes and modifications may be made without departing from this invention in its broader aspects. For example, the present invention was described with reference to a specific processor. However, any in-order machine can be used in accordance with this invention. Therefore, the appended claims encompass all such changes and modifications as fall within the true spirit and scope of this invention.

We claim:

1. A method for resolving conditional branch instructions in an in-order pipeline processor, the method comprising:

scanning stages from a later stage in the pipeline to an earlier stage in the pipeline, wherein said scanning comprises first scanning a stage after a write stage, and wherein the pipeline comprises, in order, the write stage, an execute stage, a memory stage, an address generation stage, a read stage and a decode stage;

determining an oldest one of said conditional branch instructions in the pipeline capable of resolution; and resolving said oldest conditional branch instruction.

2. The method of claim 1, wherein said determining comprises determining the latest stage in the pipeline having sufficient condition codes to resolve an associated branch instruction.

3. The method of claim 1, wherein said scanning 20 comprises scanning stages from a write stage to stage where said conditional branches are predicted.

4. The method of claim 1, wherein said scanning is in order.

\* \* \* \* \*

UNITED STATES PATENT AND TRADEMARK OFFICE
CERTIFICATE OF CORRECTION

PATENT NO. : 6,578,134 B1
DATED : June 10, 2003
INVENTOR(S) : Van Dyke et al.

Figure 2A:
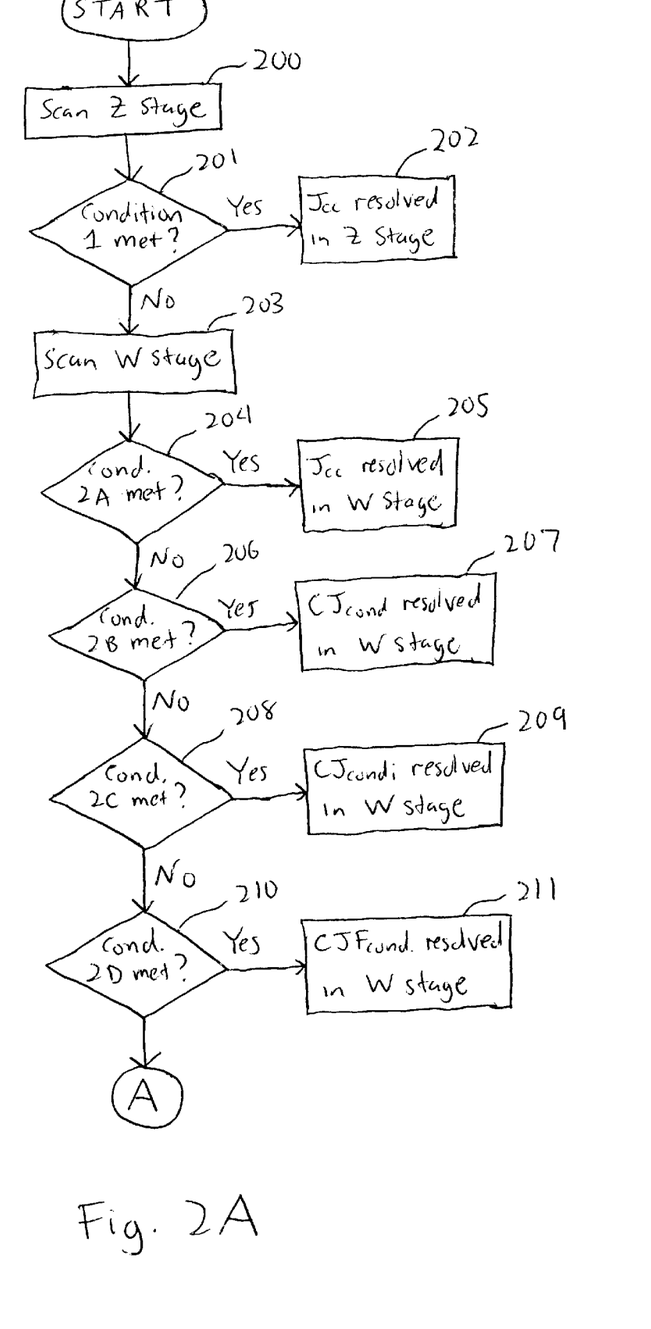
FIGS. 2A–2D are portions of a flowchart for branch resolution logic for the pipeline of FIG. 1.
Figure 2B:
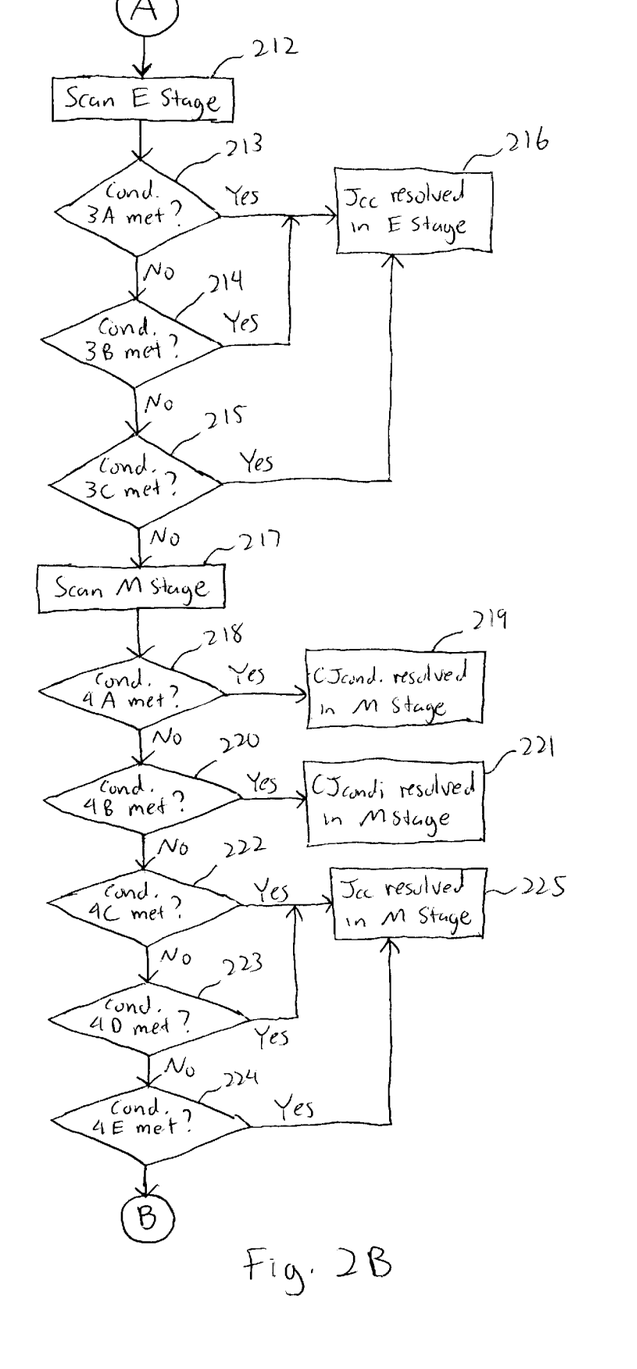
Figure 2C:
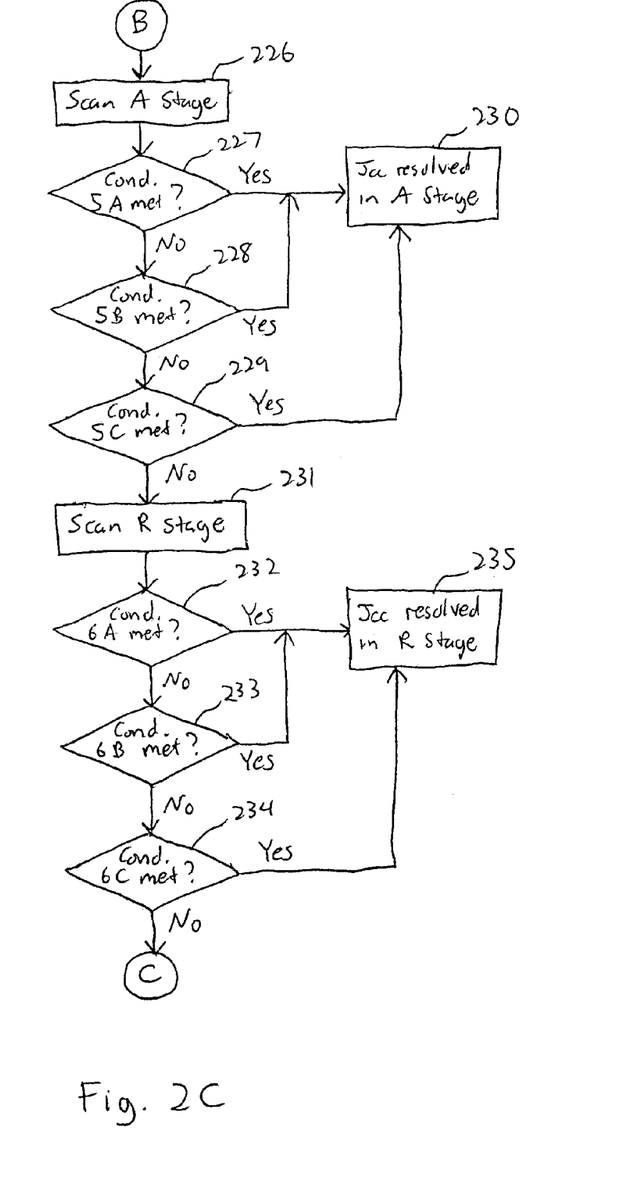
Figure 2D:
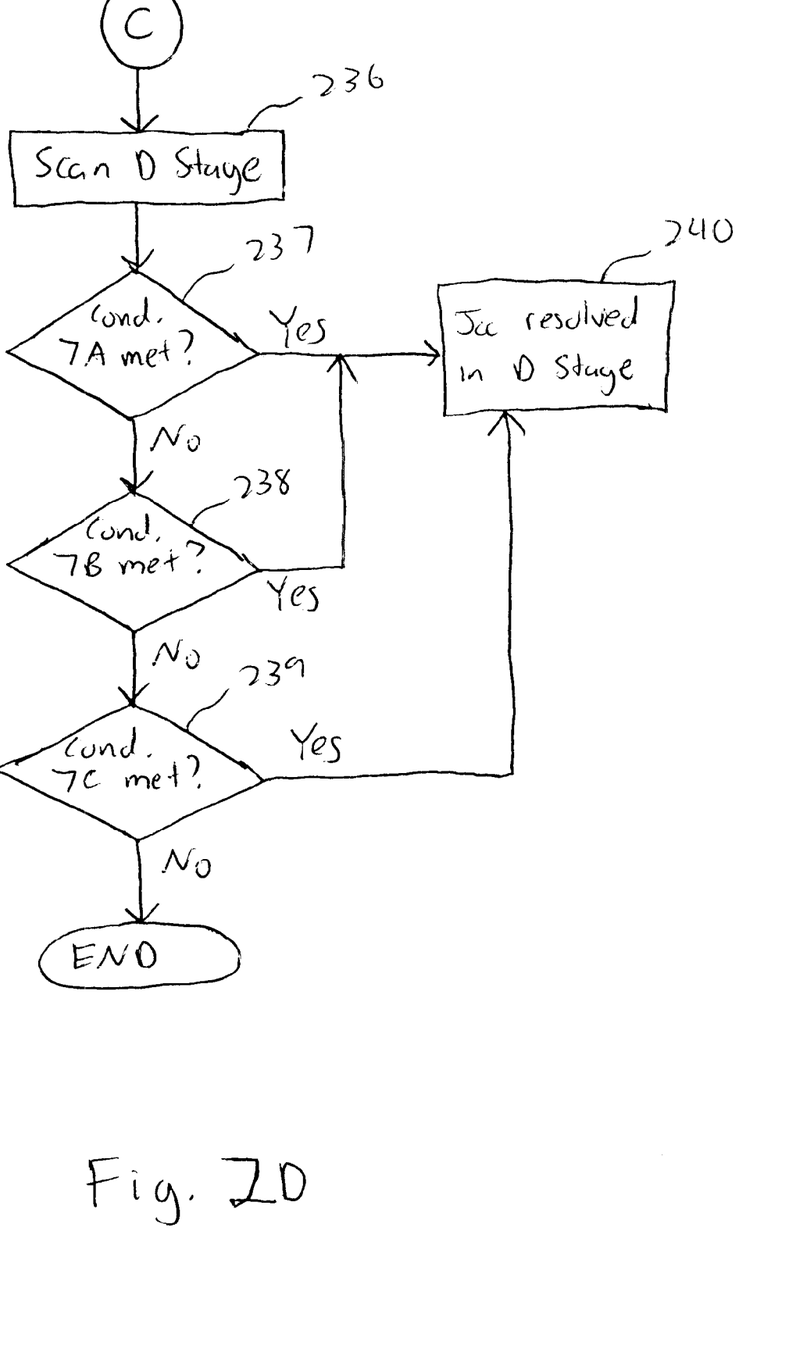

It is certified that error appears in the above-identified patent and that said Letters Patent is hereby corrected as shown below:

Drawings,
Add drawing sheet(s), consisting of Fig. 2C, as shown on the attached page.

Signed and Sealed this

Seventh Day of October, 2003

JAMES E. ROGAN
*Director of the United States Patent and Trademark Office*

Fig. 2C